United States Patent Office 3,296,656
Patented Jan. 10, 1967

3,296,656
PROCESSING OF SHRIMP AND THE LIKE
James L. Self, 213 Frazer St., Lake Charles, La. 70601
No Drawing. Filed June 2, 1965, Ser. No. 460,813
8 Claims. (Cl. 17—45)

This invention relates to the processing of shrimp and the like, and more particularly to the separation of the edible and non-edible portions thereof.

It is, of course, well known that in the case of various foodstuffs, and particularly seafoods, considerable difficulty is caused by the necessity of having to remove the edible portions thereof from the non-edible portions. In the case of shrimp it is particularly important that the non-edible heads be severed from the tail or edible part of the body.

To a considerable extent this is still being done by hand, which is a disagreeable and tedious operation; and one which is costly if done on a commercial basis.

In the past a number of machines have been proposed for automatically separating the heads of shrimps from the bodies thereof. One of these is disclosed and claimed in my Patent No. 2,794,209, dated June 4, 1957; and it involves a travelling horizontally disposed belt, with means for feeding the shrimp one at a time to the belt, together with means for lifting or elevating the antennae or feelers of the shrimp as they move with the belt to a position to be gripped by a travelling gripper device and suspended thereby while being brought into contact with a deheader properly located so as to sever the shrimp bodies form the heads in the proper area. Means are also provided therein for receiving such shrimp as may have failed to be engaged by the gripper in order that they may be re-fed to the device, as well as means for receiving the severed bodies, and further means for receiving the heads as they are finally discharged from the machine.

The machine described immediately hereinbefore, and perhaps others which are known in the art, provide certain advantages over performing the desired separation by hand; but so far as I am aware they all involve a sizeable number of cooperating elements which are fairly expensive to manufacture, install and maintain.

It is among the objects of the present invention to provide a novel method for efficiently separating the edible and non-edible portions of shrimp and the like, including not only the separation of the tail from the body or tail portion, but also the shell from the latter.

Another object is the attainment of the foregoing in a manner which is rapid and which involves a relatively low investment in machinery etc.

With the foregoing objects in view, together with others which will appear as the description proceeds, the invention comprises the novel method as well as the construction and arrangement of mechanical parts hereinafter fully described and claimed.

The present invention involves the discovery that when certain seafoods, and particularly such crustaceans as shrimp, crayfish, oysters, clams, etc. are semi-frozen, certain of the shell portions thereof are more readily removed from the edible portions; and more specifically that when shrimp are semi-frozen as by being submerged in a cold liquid solution of brine or the like, the tail portion becomes fairly strong and stiff; the heal also becomes sound; and the neck section (or head-to-tail joint) is, at the proper temperature, relatively weak.

Upon immersing shrimp in such a cold liquid solution, and imparting agitation thereto, the result will be the loosening and separation of the head from the tail at exactly the desired point.

Since the separated heads and tails of the shrimp possess different densities they can easily be classified by flotation in a brine or other solution of the proper density.

When chilled in the manner aforesaid and passed over a foraminous surface, the heads of the shrimp may be separated from the remainder thereof upon passing a properly regulated air current upwardly through the apertures in the foraminous surface: that is an air current which will lift only the head of the shrimp but not the remainder thereof.

The presence of crushed ice in the chilled solution of brine, etc. during the agitation improves the desired separation. However, I have found that when the solution is properly chilled a filler material such as small plastic pellets increases the resistance to agitation, and thereby improves the operation.

In any event, it is essential that the shrimp after being chilled to the extent described are agitated sufficiently to make them change their direction rather abruptly.

The shrimp to be processed are placed in a vessel containing a brine or other suitable solution. In the case of shrimp the temperature of the solution may acceptably be between 24° F. and 34° F. and preferably around 25° F. and 26° F.

The agitation is begun long before the shrimp have had the opportunity to arrive at the temperature of the brine or other solution. Immersion of the shrimp in a standard brine solution at around 25° F. and 26° F. for approximately one minute has been found very satisfactory when followed by agitation for approximately five minutes.

Simple experimentation with the particular solution and time and temperature of immersion therein will readily indicate the most satisfactory conditions of chilling and extent of agitation.

In the given example of one minute immersion in a standard brine solution at 25° F. and 26° F. followed by agitation for approximately five minutes, excellent results were obtained. Not only were the non-edible heads separated from the tail or edible body portion of the shrimp, but the vast majority of the shrimp being treated were completely peeled.

As described earlier herein the chilling step weakens the joint between the head and tail sections; and agitation sufficient to cause the shrimp to change their direction rather abruptly results in their separation at said joint. In other words, the parting of the head and tail sections is accomplished by the unequal agitational forces on the various parts of the shrimp. If the head enters the opposing fluid etc. first, it will be jerked first, thereby tending to cause movement at the head-and-tail joint. Repetition of this movement causes complete separation.

The following means of appropriately agitating the shrimp may be employed in lieu of, or in addition to, the several means referred to earlier herein:

(1) Causing the previously chilled shrimp to be moved in a stream of liquid (such as water) which is moving swiftly in a different direction.
(2) Causing the previously chilled shrimp to be swiftly moved in a relatively still liquid (such as water).

When utilizing, in the brine or other chilling solution, a material which increases resistance to agitation and therefore assists in the separation process, said material should be fairly close in density to that of the solution. While crushed ice and small plastic pellets have been earlier disclosed for this purpose the invention also contemplates various viscous materials which might be found suitable.

In any event, the magnitude of the agitating forces must be so controlled as to avoid damage to the edible tail or body portion of the shrimp.

Having thus described my invention, what I claim as new and desire to secure by Letters Patent is:

I claim:
1. The method of deheading and deshelling crustaceans which include chilling the same in a liquid chilling solution to an extent which is sufficient to weaken the joint between the flesh and the shell; and then subjecting the chilled crustaceans to a degree of agitation for a sufficient period which collectively are sufficient to cause complete separation.

2. The method of deheading shrimp which includes chilling the same in a liquid chilling solution to an extent which is sufficient to weaken the joint between the tail and head portions thereof; and then subjecting the chilled shrimp to a degree of agitation for a period of approximately 5 minutes to thereby cause complete separation.

3. The method of deheading and deshelling crustaceans which includes immersing the same in a liquid chilling solution having a temperature of less than 34° F. for a period of time which is sufficient to weaken the joint between the flesh and the shell; and then subjecting the chilled crustaceans to a degree of agitation which is sufficient to cause complete separation.

4. The method of claim 3 wherein the degree of agitation is sufficient to cause the crustaceans to change direction of motion.

5. The method of claim 3 wherein the degree of agitation is sufficient to cause the crustaceans to change direction of motion and is continued for a period of approximately 5 minutes.

6. The method of deheading shrimp which includes immersing the same in a liquid chilling solution having a temperature of less than 34° F. for a period of time which is sufficient to weaken the joint between the head and tail sections of the shrimp and then subjecting the shrimp to a degree of agitation which is sufficient to cause complete separation.

7. The method of claim 6 wherein the degree of agitation is sufficient to cause the shrimp to change direction of motion.

8. The method of claim 6 wherein the degree of agitation is sufficient to cause the shrimp to change direction of motion and is continued for a period of approximately 5 minutes.

References Cited by the Examiner

UNITED STATES PATENTS

| | | | |
|---|---|---|---|
| 2,491,778 | 12/1949 | Smith | 17—4 |
| 2,534,767 | 12/1950 | Greiner et al. | 17—45 |
| 3,209,393 | 10/1965 | Stephenson | 17—2 |

SAMUEL KOREN, *Primary Examiner.*

LUCIE H. LAUDENSLAGER, *Examiner.*